Aug. 5, 1958   JEAN-MICHEL BALUTEAU   2,845,845
ORTHOSCOPIC WIDE ANGLE OBJECTIVE
Filed April 4, 1956
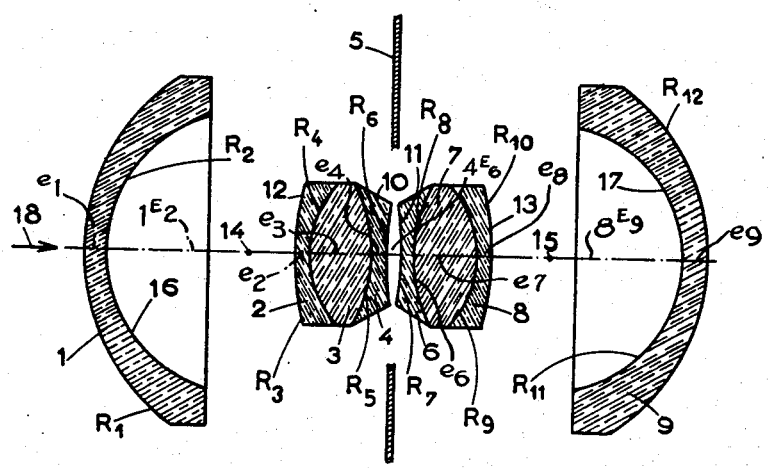
INVENTOR
JEAN-MICHEL BALUTEAU
BY Cameron, Kerkam & Sutton
ATTORNEYS

United States Patent Office 2,845,845
Patented Aug. 5, 1958

2,845,845

ORTHOSCOPIC WIDE ANGLE OBJECTIVE

Jean-Michel Baluteau, Paris, France, assignor to Societe d'Optique et de Mecanique de Haute, Paris, France Application April 4, 1956, Serial No. 576,124

Claims priority, application France April 13, 1955

3 Claims. (Cl. 88—57)

This invention relates to orthoscopic wide angle objective. Such an objective finds a particularly important application to photogrammetric problems. Its aperture angle may exceed 90°.

Wide angle objectives are already known, and in particular objectives comprising an optical system disposed between two divergent optical elements, but when they comply with the requirements of certain problems and specially with those of photogrammetry, they are generally very cumbersome and of a delicate construction.

The invention provides an orthoscopic wide angle objective comprising a diaphragm and an optical system disposed between two divergent lenses, characterised in that the optical system is constituted by two convergent groups of lenses disposed on both sides of the diaphragm, each of these groups comprising at least three lenses.

Other features of the invention will become clear from the following description of the particular embodiment of the invention.

The single figure of the drawing illustrates diagrammatically an objective according to the invention.

The object illustrated in the drawing comprises in succession a divergent lens 1, a convergent group of lenses 2, 3 and 4, a diaphragm 5, a convergent group of lenses 6, 7 and 8, and a divergent lens 9.

Each divergent lens 1 or 9 is in the shape of a meniscus, and faces with its concave side towards the diaphragm 5.

The three lenses of each of the convergent groups are cemented to one another or separated by narrow air spaces. According to the invention each group of the three lenses encloses at least one convergent and at least one divergent lens. In the case represented in the drawing two divergent lenses 2, 4 or 6, 8 are disposed on either side of a convergent lens 3 or 7.

The surface 10 or 11 of the lens 4 or 6, placed on the side of the diaphragm has a radius of curvature exceeding the total focal length of the objective.

The surface 12 or 13 of the lens 2 or 8 of a convergent group forms a convergent dioptric the centre of which is situated on the side of the diaphragm 5.

Besides, according to the invention, the aperture at the centres 14 or 15 of the concave faces 16 and 17 of the divergent lenses 1 and 9 should be smaller or equal to 160°. Moreover, the air gap separating a convergent group of lenses of the immediately adjacent divergent lens 1 or 9, ought to be between 25 and 40% of the total focal length of the objective.

Another feature of the invention consists also in the fact that the distance between the convex surfaces 12 and 13 of the convergent groups of lenses should be smaller than 60% of the total focal length of the objective.

Finally, the longitudinal space requirement of the objective is smaller than or equal to 125% of its total focal length.

The objective which has just been described gives a good correction of the all-over aberrations and a practically perfect orthoscopic effect.

For example of a focal distance of 100 millimetres the difference between the magnitudes of the theoretical image and the actual image remains, owing to the invention below 5 microns. This difference may even be reduced to 1.5 microns by adopting a compensated focal lens.

In order to attain over the whole extent of the field a good chromatic correction it is of advantage to take for the various lenses composing the convergent groups similar coefficients of dispersion the difference between the highest and the lowest of these coefficients being below 10.

The embodiment described hereinabove may be put in operation by adopting for each lens the following characteristics for which:

R denotes the radius of the surfaces met by light rays propagated in the sense of the arrow 18, the index appended to R indicating the order in which these light rays meet these surfaces; $e$ denotes the thickness of each lens, the index appended to $e$ being a reference to the corresponding lens;

E denotes the air gap separating two lenses, the two indices being references to the lenses separated by this air gap.

$n_D$ denotes the refractive index of each lens for a ray of D: 5893 Angstrom units.

$\nu$ denotes the coefficient of dispersion of each lens.

The lengths are given in millimetres.

| | | | |
|---|---|---|---|
| $R_1 = +41.22$ | $e_1 = 4.04$ | $n_D = 1.65700$ | $\nu = 57$ |
| $R_2 = +27.44$ | $E_{1,2} = 37.02$ | | |
| $R_3 = +58.11$ | $e_2 = 2.69$ | $n_D = 1.71700$ | $\nu = 48$ |
| $R_4 = +18.03$ | $e_3 = 12.91$ | $n_D = 1.69100$ | $\nu = 54$ |
| $R_5 = -26.37$ | $e_4 = 3.23$ | $n_D = 1.62427$ | $\nu = 46.8$ |
| $R_6 = +145.29$ | $E_{4,6} = 1.90$ | | |
| $R_7 = -140.37$ | $e_5 = 3.12$ | $n_D = 1.62411$ | $\nu = 57$ |
| $R_8 = +25.47$ | $e_7 = 12.48$ | $n_D = 1.69100$ | $\nu = 54$ |
| $R_9 = -17.42$ | $e_8 = 2.60$ | $n_D = 1.71700$ | $\nu = 48$ |
| $R_{10} = -56.15$ | $E_{8,9} = 35.77$ | | |
| $R_{11} = -26.51$ | $e_9 = 4.42$ | $n_D = 1.65310$ | $\nu = 33.5$ |
| $R_{12} = -39.82$ | | | |

Finally the diaphragm is placed at 0.94 millimetres from the lens 6.

An objective having the characteristics defined hereinabove has a focal length of 100 millimetres, and aperture F/5.55 and a "draw" that is to say the distance between the image plane and the divergent lens 9, equal to 58.76.

Well understood, the invention is not limited to the exact features of the embodiment described hereinabove, and the latter may in fact undergo modifications in details without departing from the scope of the invention.

What I claim is:

1. In an orthoscopic wide angle objective comprising two outer divergent meniscus shaped single lens components concave towards each other and enclosing two convergent meniscus shaped triplet components concave towards each other and enclosing an air space therebetween, a diaphragm in the air space between the said triplet components, the said air space between the triplet components being between 25% and 40% of the total focal length of the objective, and the radii of the concave surfaces of the said triplet components on the side of the diaphragm exceeding the total focal length of the objective.

2. An orthoscopic wide angle objective as described in claim 1, in which the thickness of the assembly of the two convergent groups of lenses measured on the optical axis is no more than 60% of the total focal length of the objective.

3. An orthoscopic wide angle objective as described in claim 1, in which the distance measured on the optical axis between the outer faces of the assembly of the two divergent lenses is no more than 125% of the total focal length of the objective.

References Cited in the file of this patent

UNITED STATES PATENTS

| 2,516,724 | Roossinov | July 25, 1950 |
| 2,721,499 | Bertele | Oct. 25, 1955 |
| 2,734,423 | Bertele | Feb. 14, 1956 |
| 2,734,424 | Bertele | Feb. 14, 1956 |

FOREIGN PATENTS

| 680,185 | Great Britain | Oct. 1, 1952 |
| 740,530 | Great Britain | Nov. 16, 1955 |